United States Patent

[11] 3,596,633

| [72] | Inventors | Horace C. Porter;<br>Marion E. Claytor, both of Gainesville, Ga. |
|---|---|---|
| [21] | Appl. No. | 687,012 |
| [22] | Filed | Nov. 30, 1967 |
| [45] | Patented | Aug. 3, 1971 |
| [73] | Assignee | Gainesville Steel Products Company<br>Gainesville, Ga. |

[54] APPARATUS FOR COATING EDIBLE FOOD PARTS
7 Claims, 10 Drawing Figs.

[52] U.S. Cl. ................................................ 118/16,
118/17, 118/24
[51] Int. Cl. ...................................................... A23g 3/20
[50] Field of Search ............................................ 118/16, 17,
24, 25, 312, 314

[56] References Cited
UNITED STATES PATENTS

| 2,525,306 | 10/1950 | Lunsford ...................... | 118/24 |
| 2,573,835 | 11/1951 | Dyar ............................ | 118/314 X |
| 2,731,942 | 1/1956 | Anderson ..................... | 118/16 |
| 2,855,893 | 10/1958 | Greer et al. ................... | 118/24 X |
| 3,381,658 | 5/1968 | Porambo ...................... | 118/24 X |
| 2,357,679 | 9/1944 | Moench ....................... | 118/13 |

*Primary Examiner*—John P. McIntosh

ABSTRACT: A method of coating food parts such as chicken parts, shrimp or potatoes, by moving the parts continuously on a conveyor while dropping a flour breading mixture on one side and then causing the parts to turn over still continuously receiving the breading substance on the other side and recovering the breading substance which has not deposited on the food parts and returning it for reuse. The apparatus comprises a machine with an open mesh conveyor on it continuously driven through a coating pan which receives a liquid flour compound under pressure and into which the edible food parts are dipped as the conveyor moves therethrough and then beneath the breading hopper which is vibrated to gravity feed the bread crumbs onto one side of the coated food parts which are conveyed to a drop-off point at which the parts flip over thereafter passing beneath another breading outlet on the breading hopper receiving bread crumbs on the other side. A screw conveyor on the machine recovers the breading compound which falls unused through the mesh conveyor and returns it to the hopper for reuse. All of the pans and other parts of the machine are removable for cleaning and may be from stainless steel as are the other parts of the machine.

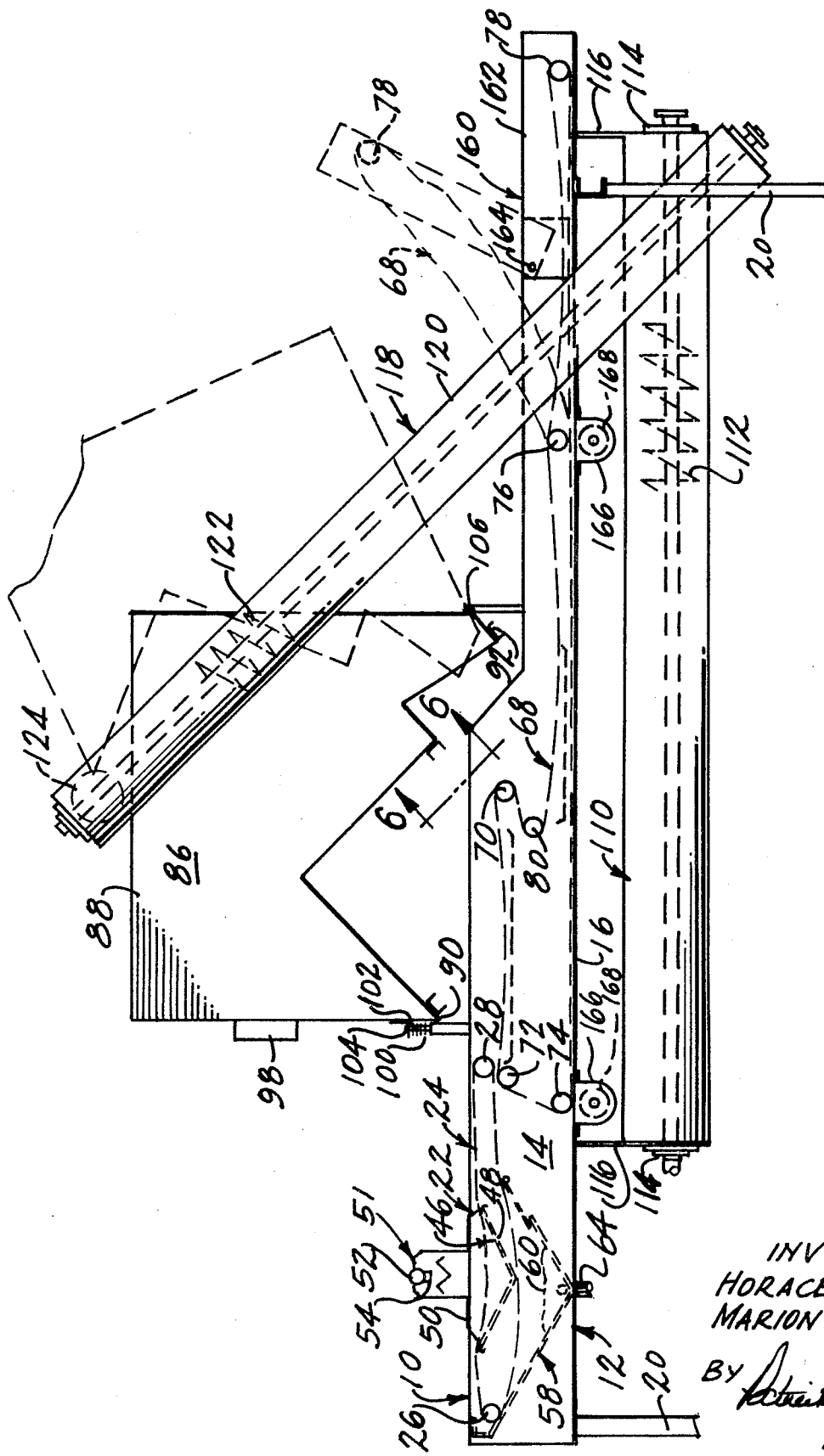

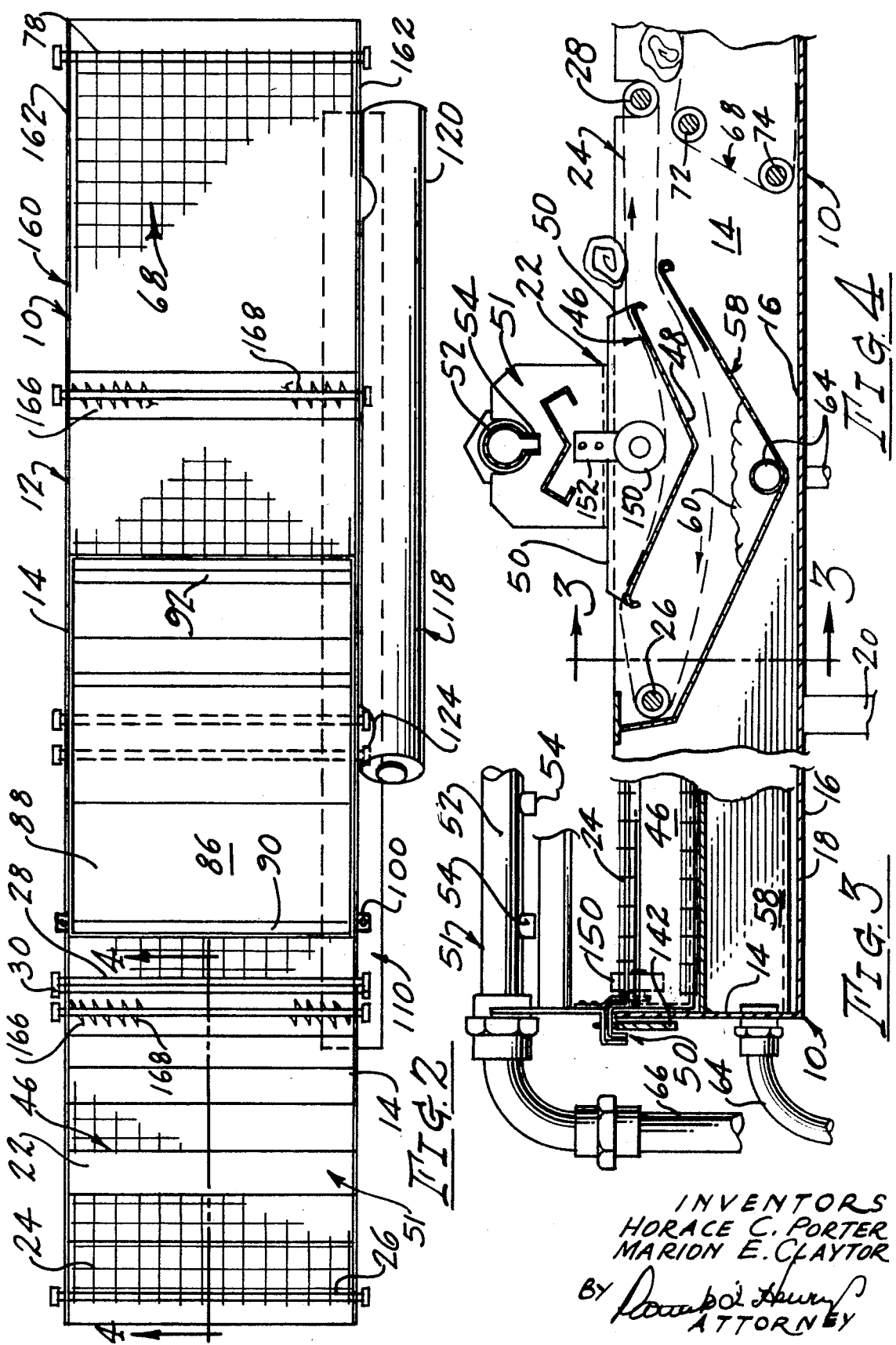

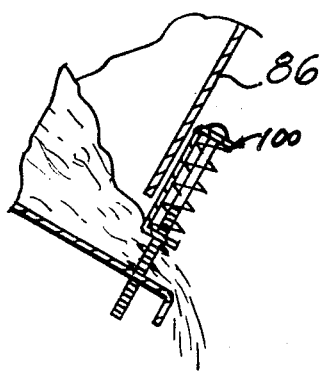
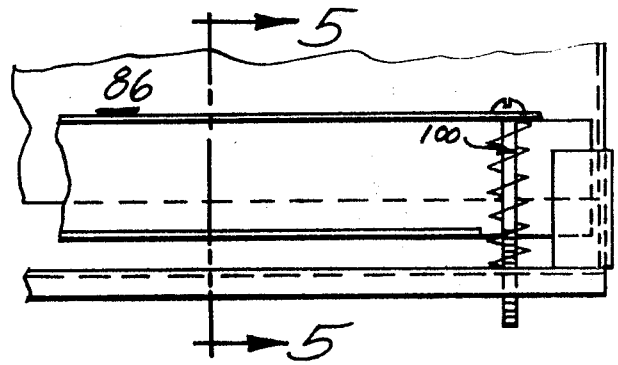
FIG. 5  FIG. 6
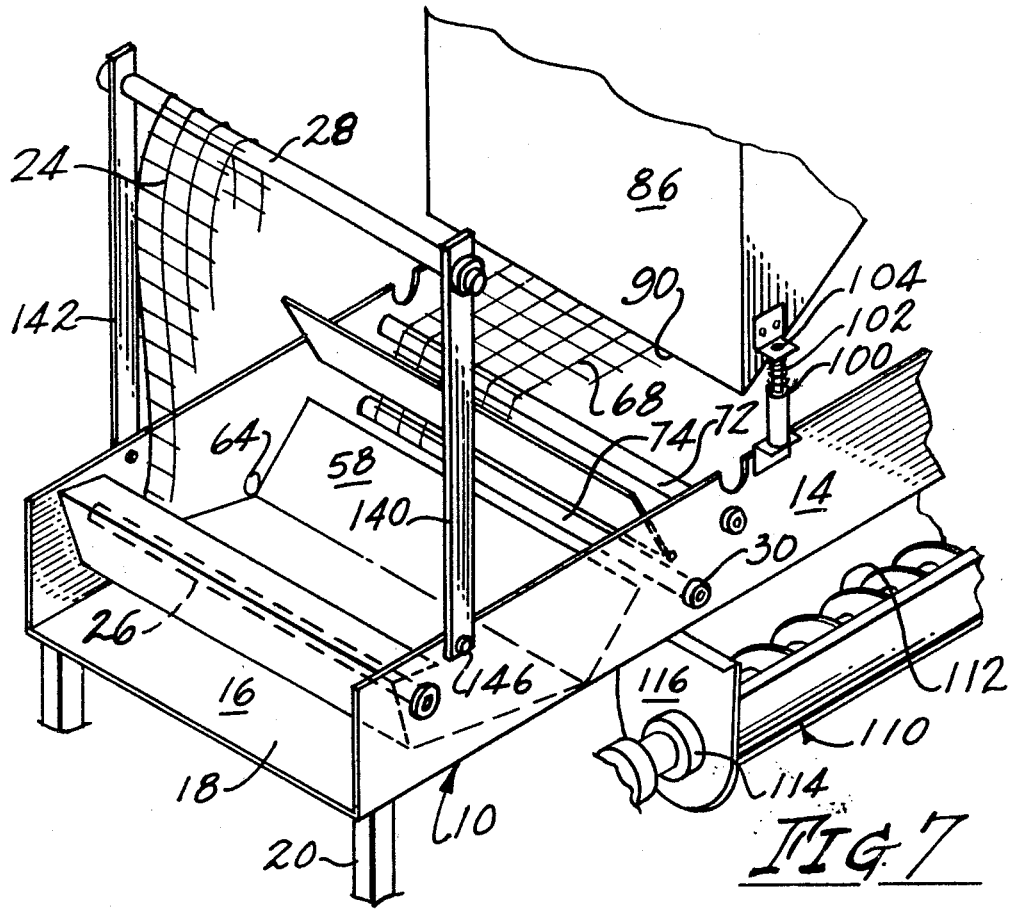
FIG. 7
INVENTORS,
HORACE C. PORTER
MARION E. CLAYTOR
BY [signature]
ATTORNEY

INVENTORS
HORACE C. PORTER
MARION E. CLAYTOR
BY
ATTORNEY 3,596,633

APPARATUS FOR COATING EDIBLE FOOD PARTS

BACKGROUND OF THE INVENTION

1. Field of the Invention

The invention relates to a method and apparatus for automatically and continuously coating food parts, such as chicken parts, found in food processing procedures and the like.

2. Description of the Prior Art

It is, of course, well known in the art and in the family kitchen to take individual food items such as chicken legs and thighs and dip them in a flour-water-spice compound which remains temporarily sticky or tacky and then to roll or pat the chicken parts in bread crumbs and other particles, such being a procedure generally known by the food processor and the housewife as breading chicken. It is well known in the art to move an item such as a piece of chicken down a conveyor line and through a pan of coating material. This per se is not new in the art. It is believed known in the art to attempt to move the entire piece of chicken through a compound at one time in an attempt to coat the entire piece of chicken by a dipping or submerging process which requires a dripping and drying type procedure. However, it is considered to be new in the art to employ a method of conveying the chicken pieces continuously on a conveyor first through the liquid coating pan to coat the chicken parts and then beneath a gravity, vibrating conveyor to receive the bread crumbs or breading material on one side and then flop the chicken parts while conveying same continuously to receive thereafter a second gravity-vibrating fed bread crumb material. Also, insofar as the present machine is concerned it is considered new in the art to arrange an open mesh conveyor to run through a pan and then under a vibrating-type hopper arrangement with spaced breading outlets one of which breads the chicken on one side and the other which breads the same piece of chicken after it has been flopped. The various details of construction of the machine are considered new and significant and they are removable for cleaning, are easily maintained and are durable.

DESCRIPTION OF THE INVENTION

In one embodiment the machine comprises a long machine frame constructed from various structural members of angle iron and the like providing a generally rectangular frame supported on the floor of a plant and having thereon a series of transversely extending conveyor drive rollers around which is driven an open mesh, chainlike conveyor of stainless steel or the like which is endless and is driven in by means of an electric motor chain drive connected to one of the rollers around which the conveyor is operated. At one end of the frame which is the input end and to which is continuously delivered pieces of chicken from the processing line, a transversely mounted series of nozzles spaced across the width above the conveyor receives a flour-liquid compound pumped therein by means of a pump which recirculates the mixture from a lower pan to an upper pan which is replenished periodically by hand. The conveyor passes first around the bottom of the upper pan and then through the upper pan and the pieces of chicken that drop on the first conveyor section are conveyed to a second conveyor section comprising a chain link conveyor above which is mounted a large three-dimensional hopper pivotally supported to be swung out of the way for cleaning and the like and on which is attached a vibrator. One lower front edge of the hopper is a transversely arranged outlet from which normally emits a line of continuously delivered bread crumbs falling by gravity on top of the pieces of chicken delivered thereunder by the conveyor. The same pieces of chicken are delivered to a point near the other end of the hopper where the conveyor drops and reverses direction temporarily causing the chicken pieces to fall and flop after which another outlet on the hopper delivers bread crumbs vibrated to gravity feed. The pieces of chicken are then conveyed to the end of the machine frame from which they fall onto another line. The unused bread crumbs which fall past the pieces of chicken and down through the conveyor are collected in a pan in which is mounted a screw conveyor which transfers the unused bread crumbs back to the hopper and automatically dumps the crumbs therein for reuse. One end of the frame may be pivoted and lifted to provide access and other portions are also removable.

BRIEF DESCRIPTION OF THE DRAWINGS

FIG. 1 is a side elevation view of a chicken breading machine made in accordance with the present invention.

FIG. 2 is a top plan view of the machine shown in FIG. 1.

FIG. 3 is an enlarged elevation view of a detail of one side on one end of the machine taken substantially along lines 3-3 in FIG. 4.

FIG. 4 is a cross-sectional enlarged view taken substantially along lines 4-4 in FIG. 2.

FIG. 5 is an enlarged cross-sectional view taken along lines 5-5 in FIG. 6.

FIG. 6 is an enlarged cross-sectional view of a detail taken along lines 6-6 in FIG. 1.

FIG. 7 is a perspective view with parts removed of the end of the machine into which the chicken is initially fed to be coated and with the conveyor swung upwardly for the removability of the pans and various parts for cleaning and accessibility thereto.

DESCRIPTION OF A PREFERRED EMBODIMENT

Figure 8:
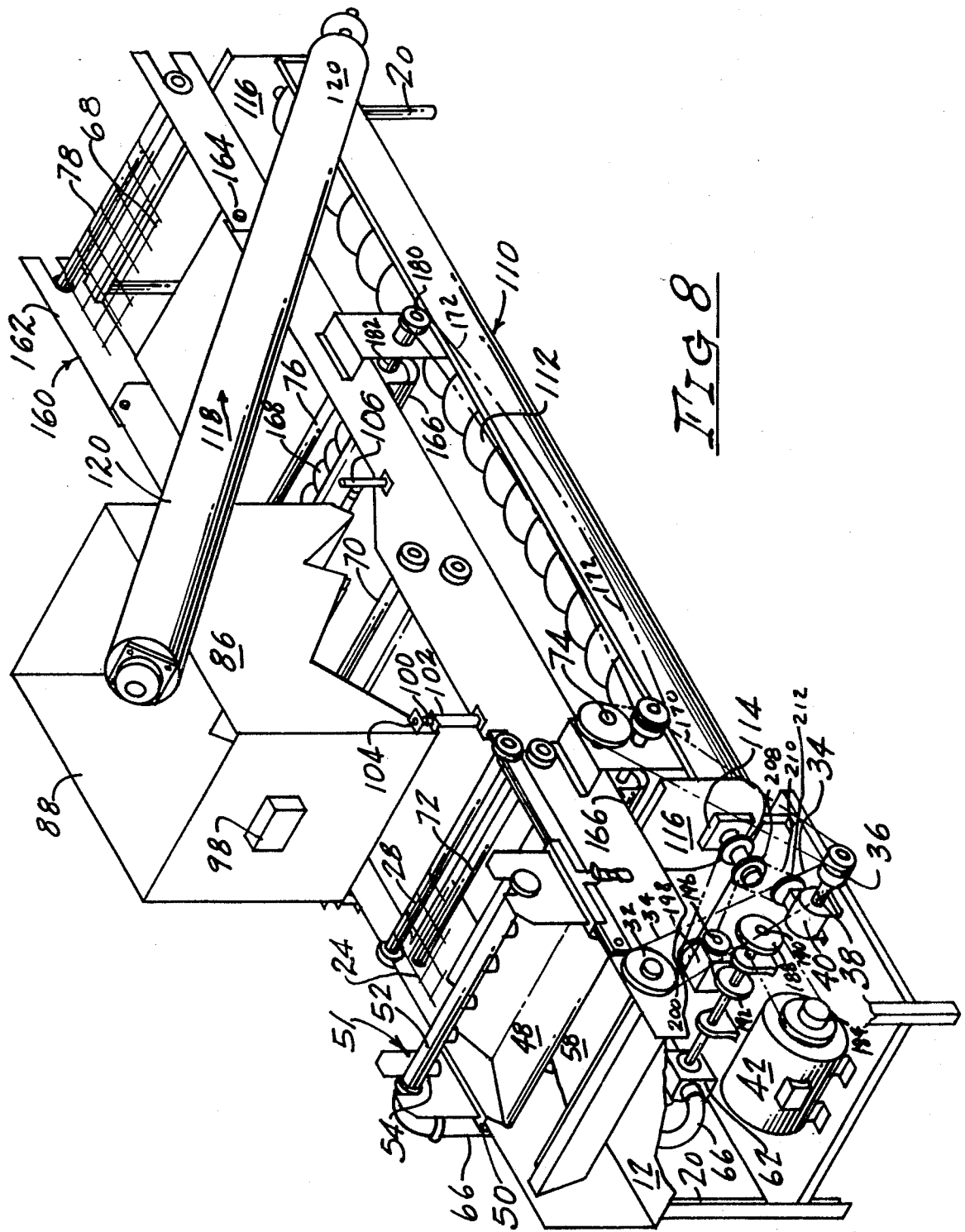
FIG. 8 is a perspective view of the present breading machine.
Figure 9:
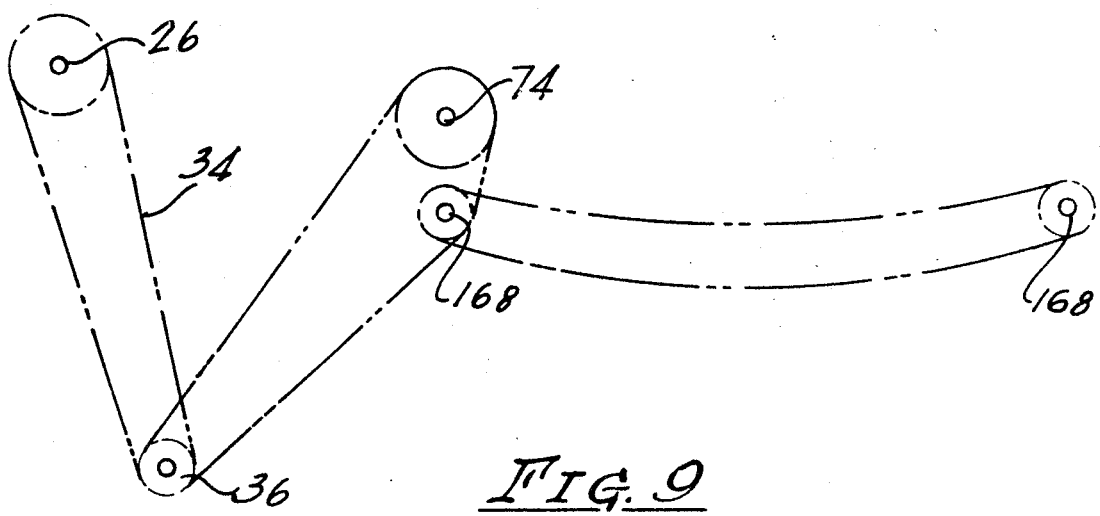
FIG. 9 is a schematic illustration of the driving chain arrangement for certain conveyors.
Figure 10:
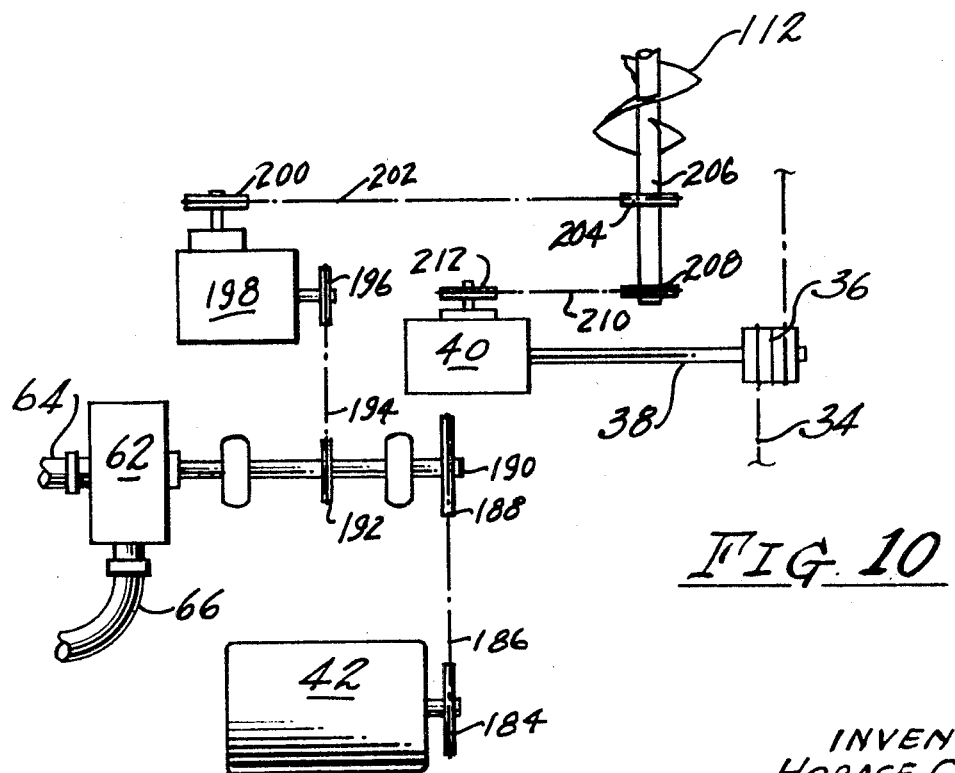
FIG. 10 is a schematic illustration of a portion of the drive arrangement for various parts of the machine.

The entire and overall machine is designated in completed assembly by reference numeral 10 in FIG. 1 and comprises an elongated, substantially rectangular machine frame designated completely in assembly by reference numeral 12 and having various longitudinal frame members 14 constructed from angle iron and other metal structural members connected together by various transverse structural members designated generally by reference numeral 16 and including flat metal or steel plate members 18 welded or otherwise attached with members 14 to construct a rigid frame supported on the floor by means of legs 20 at each corner made from angle iron or the like.

The machine comprises a coating section designated generally and overall by reference numeral 22 and comprising a continuously driven, endless conveyor 24 constructed from links of attached metal parts which are flexible and substantially open to allow debris and materials to fall therethrough but small enough to prevent the chicken parts from falling therethrough. Conveyor 24 is conveyed endlessly and continuously about a pair of spaced rollers 26, 28 supported in bearings and on supports 30 on each side 1r of the machine frame and conveyor 24 is driven by means of a drive sprocket 32 driven by chain 34 from a sprocket 36 on a shaft 38 connected to a transmission 40 driven through a series of chains, sprockets and shafts (to be described later in conjunction with other conveyors) from electric motor 42.

A stainless steel pan 46 in which the chicken is coated comprises an angled bottom having portions 48 and small angular flanges 50 which clip over portions of the machine frame to support the pans for removability therefrom. Spaced above the pan 46 is a coating compound delivery apparatus 5 comprising a pipe 52 having a plurality of spaced nozzles 54 thereon from which is continuously emitted and delivered the fluid coating compound normally contained within a second pan 58 having a V-shaped bottom comprising two parts in which the coating compound 60 is located. Compound 60 is pumped by means of a pump 62 through a pipe 64 through another pipe 66 back to the supply pipe 52 to the nozzle 54 whereby the fluid coating compound which falls or overflows over the ends of the pan 46 and drops through the conveyor 24 falls into the pan 58 and is recirculated back through the supply pipe 52 continuously. From time to time the material is replenished by hand by dumping a batch into the pan 58.

A second and longer conveyor 68 constructed from chain-link identical with conveyor 24 is endless and is conveyed continuously around a series of transverse rollers 70, 72, 74, 76 and 78 located in spaced relationship along the frame. A roller 80 is located in close proximity to roller 70 and causes a dropoff at this point which flops the chicken parts as previously mentioned. Above conveyor 68 is located a large hopper 86 of three-dimensional configuration having an open top 88 and having a first transversely formed outlet 90 at the front end and a second similar outlet 92 at the rear end the purpose of which is to deliver to one side of the chicken conveyed on conveyor 68 from the coating conveyor 24 bread crumbs or other granular food particles for coating one side and then as the conveyor 68 conveys the chicken parts across the reverse direction of conveyor 68 between rollers 70 and 80 the chicken is flopped and receives the second supply of bread crumbs on the other side supplied through the outlet 92. The hopper 86 is vibrating continuously by means of a conventional vibrator 98 of the sort which is supplied by the Cleveland Vibrator Company located at 2828 Clinton Avenue, West, Cleveland, Ohio, 44113. Hopper 86 is held in place by means of a spring latch mechanism 100 comprising a coil spring 102 and a catch 104 which latches the catch 104 to a portion of the hopper body. The rear part of hopper 86 is pivoted at 106 to the frame 12 and as shown in dotted lines in FIG. 1 the hopper may be unlatched at 100 and swung out of the way for reaching the conveyor, for cleaning and for other purposes.

As the bread crumbs or other breading material or granular substance drop on the chicken parts on the conveyor 68 part of the crumbs fall through the chicken parts into a collection pan 110 which is an elongated, body located beneath the frame 12 and next to which is mounted a continuously operating screw conveyor 112, mounted on journals 114 on frame supports 116 on the frame 12, and operating continuously to pick up the solid bread crumb material in the pan 110 and to transport it to another screw conveyor apparatus designated generally by reference numeral 118 and comprising a housing 120 in which is mounted a screw conveyor 122 transporting the material to an outlet 124 from which it is dumped into the top 88 of the hopper 86.

As seen in FIG. 7, one end of the frame on which roller 28 is mounted comprises a pair of spaced, pivoted links 140, 142 pivoted by bolts 146 to frame side 14 so that the conveyor 24 can be slacked and the entire assembly of the links 140, 142 and the roller 28 moved upwardly to provide access to the respective pans 48 and 58 which must be cleaned and serviced. The pan 48 is supported as mentioned previously on small bent portions 50 to allow the pan to be unsnapped and removed. The chain conveyor is maintained in sufficient tautness in the pan 48 by means of an idler roller 150 constructed from nylon or the like and mounted on a small bracket 152 attached to a portion of the coating feed assembly 51.

In similar fashion to the front end of the machine on which is mounted the pivoted assembly having roller 28, at the opposite or rear outlet end of the machine there is the pivoted assembly designated generally by reference numeral 160 and comprising a pair of frame members 162 attached by bolts 164 to the side frame members 14 and having the roller 78 mounted thereon with the chain conveyor 68 passing therearound whereby manually this section 160 may be lifted, the conveyor 68 allowed to slack and access is provided to this end of the machine.

Transverse conveyors 166 each includes a screw conveyor 168 and each conveyor 166 is arranged to collect the material dropped at each respective end of the conveyor 68 and to transport the material transversely to the main conveyor 110. Each conveyor 166 is driven by a respective chain 170, 172 driven from sprocket 36; chain 170 drives a double sprocket 174 which also drives chain 172. Double sprocket 174 is fixed on a shaft 176 which has one of the screw conveyors 168 thereon; chain 172 drives a sprocket 180 on a shaft 182 which has the other conveyor 168 thereon.

Motor 42 drives a sprocket 184 which drives a chain 186 driving a sprocket 188 on a shaft 190 which drives pump 62. Shaft 190 has another sprocket 192 thereon driving a chain 194 which drives a sprocket 196 on a power transmission 198 having an output sprocket 200 which drives a chain 202 drivably engaging a sprocket 204 on a shaft 206 extending through conveyor 112 and rotating same. The external end of shaft 206 also has a sprocket 208 driving a chain 210 which engages and drives sprocket 212 on transmission 40 which drives shaft 38, sprocket 36, etc., as described previously.

While we have shown and described a particular method and a certain apparatus for carrying out the method, this is by way of illustration only and does not constitute any sort of limitation on the scope of our invention since various alterations, changes, deviations, eliminations, additions, modifications, substitutions and departures may be made from the method and apparatus disclosed without departing from the scope of our invention as defined by interpretation of the appended claims.

We claim:

1. An apparatus for coating food parts such as chicken or shrimp with a flour coating to which is adhered small particles such as bread crumbs and wherein the coating is initially liquid and remains sticky or tacky until the crumbs have been applied, said apparatus comprising:
    a. an elongated machine frame having an input end onto which food parts are continuously fed and an output end from which parts are continuously removed,
    b. a first endless conveyor mounted on said input end to which the parts are delivered and which transports same through the first portion of the apparatus,
    c. means for applying a coating compound to said parts to coat same while being transported by said first conveyor,
    d. means continuously supplying coating compound to said means in "c,"
    d'. a second endless, open mesh conveyor mounted on said frame and including a receiving portion disposed to receive from said first conveyor food parts covered with coating compound, a discharge portion extending from said receiving portion to said output end and a reentrant section supported for travel in a direction different from that of said receiving and discharge portion, the discharge end of the receiving portion being spaced above the receiving end of the discharge portion at said reentrant section a distance sufficient for a food part to drop freely therefrom and to turn over in dropping onto said receiving end of the discharge portion,
    e. means continuously dispensing crumbs onto said coated parts on said second conveyor and including a supply container for crumbs disposed above said second conveyor, said container having a first outlet disposed above said receiving portion and a second outlet disposed above said discharge portion,
    f. and means for transferring crumbs from beneath said second conveyor to said container including a first transverse conveyor disposed beneath said receiving portion, a second transverse conveyor disposed beneath said discharge portion, and further conveyor means disposed between the discharge end of said transverse conveyors and said container for receiving crumbs from said transverse conveyors and conveying them to said container.

2. The apparatus as defined in claim 1, wherein there is a coating pan through which said parts are conveyed by said first conveyor and a collection pan disposed below said coating pan, said coating pan overflowing into said collection pan whenever the coating compound overfills same said coating compound in the collection pan being recirculated to the means for applying a coating compound.

3. The apparatus as defined in claim 2, wherein said first conveyor means is an open mesh, conveyor with the upper flight thereof moving over said coating pan and the lower flight thereof moving over said collection pan and around spaced supports, and one end of said first conveyor is pivotally mounted on said frame for movement to a raised position from an operative position to provide access to said pans.

4. The apparatus as defined in claim 3, wherein said collection and coating pans are removably mounted on said frame for cleaning.

5. The apparatus as defined in claim 1, wherein said container is pivotally mounted on said frame for movement to an inoperative position spaced from said second conveyor to provide access to said second conveyor.

6. The apparatus as defined in claim 1, wherein the reentrant section of said second conveyor is supported for change of direction about at least two spaced locations, and at least one end of said second conveyor is pivotally mounted on said frame and may be moved out of the way to reach parts of the machine normally obstructed thereby.

7. The apparatus as defined in claim 1, wherein said further conveyor for crumbs includes a longitudinal screw-type conveyor and a diagonal screw-type conveyor fed from said longitudinal conveyor, said diagonal conveyor feeding into said crumb container.